US008336027B2

(12) United States Patent
Aitken et al.

(10) Patent No.: US 8,336,027 B2
(45) Date of Patent: Dec. 18, 2012

(54) HIERARCHICAL VIEW STATE STORAGE

(75) Inventors: William Emeric Aitken, Mercer Island, WA (US); Simon David Kent, Redmond, WA (US); Siddharth Jayadevan, Seattle, WA (US); Christopher Donald Hackmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 12/472,930

(22) Filed: May 27, 2009

(65) Prior Publication Data
US 2010/0306731 A1     Dec. 2, 2010

(51) Int. Cl.
G06F 9/44    (2006.01)

(52) U.S. Cl. ........ 717/121; 717/120; 715/210; 709/206; 709/224

(58) Field of Classification Search .......... 717/104–140; 715/209–212; 707/600, 601, 694, 705; 709/206, 709/224
See application file for complete search history.

(56) References Cited

U.S. PATENT DOCUMENTS

| | | | | |
|---|---|---|---|---|
| 5,758,032 | A | * | 5/1998 | Sanders ............................ 706/45 |
| 5,960,194 | A | * | 9/1999 | Choy et al. ............................ 1/1 |
| 6,071,317 | A | | 6/2000 | Nagel |
| 6,351,843 | B1 | | 2/2002 | Berkley et al. |
| 6,378,128 | B1 | | 4/2002 | Edelstein |
| 6,438,562 | B1 | * | 8/2002 | Gupta et al. .................. 707/696 |
| 6,470,344 | B1 | * | 10/2002 | Kothuri et al. ................ 707/696 |
| 6,496,976 | B1 | | 12/2002 | Smith |
| 6,502,176 | B1 | | 12/2002 | Kobayashi |
| 6,836,884 | B1 | | 12/2004 | Evans |
| 6,915,513 | B2 | | 7/2005 | Duesterwald |
| 7,386,832 | B2 | | 6/2008 | Brunner |
| 7,818,736 | B2 | | 10/2010 | Appavoo |
| 2002/0147763 | A1 | | 10/2002 | Lee |
| 2003/0135825 | A1 | | 7/2003 | Gertner |
| 2004/0162943 | A1 | | 8/2004 | Degenaro et al. |
| 2005/0071839 | A1 | | 3/2005 | Kim |
| 2005/0172282 | A1 | | 8/2005 | Shenfield et al. |

(Continued)

FOREIGN PATENT DOCUMENTS
WO    WO2006118823    11/2006

OTHER PUBLICATIONS

Mandal et al., A Critical Evaluation of Image and Video Indexing Techniques in the Compressed Domain, Published in Image and Vision Computing Journal, vol. 17, Issue 7, pp. 513-529, May 1999.*

(Continued)

*Primary Examiner* — Wei Zhen
*Assistant Examiner* — Satish Rampuria
(74) *Attorney, Agent, or Firm* — Workman Nydegger

(57) ABSTRACT

Indexing domains of a declarative application with view state information for the domain to enable persisting the view state of the declarative application. The domains are organized in a tree. Each domain is built by a configuration builder. The method includes indexing a domain of a declarative application by indexing a path name in an index. The path name includes a path name of the parent domain of the domain; an identifier of the configuration builder used to build the domain; and an identifier of one or more local decisions made by the configuration builder when creating the domain. The method further includes correlating a unique identifier key to the path name in the index and correlating view state information for the domain to the unique key identifier.

18 Claims, 2 Drawing Sheets

U.S. PATENT DOCUMENTS

| | | | |
|---|---|---|---|
| 2006/0053419 A1 | 3/2006 | Barfield | |
| 2006/0130038 A1 | 6/2006 | Claussen | |
| 2006/0190924 A1 | 8/2006 | Bruening et al. | |
| 2006/0206860 A1 | 9/2006 | Dardinski | |
| 2006/0248112 A1 | 11/2006 | Williams | |
| 2006/0248448 A1 | 11/2006 | Williams | |
| 2007/0094648 A1 | 4/2007 | Post | |
| 2007/0261041 A1 | 11/2007 | Amini et al. | |
| 2007/0288890 A1 | 12/2007 | Wells | |
| 2008/0028340 A1 | 1/2008 | Davis | |
| 2008/0120605 A1 | 5/2008 | Rosen | |
| 2009/0125878 A1* | 5/2009 | Cullum et al. | 717/106 |
| 2009/0288069 A1 | 11/2009 | Kent | |

OTHER PUBLICATIONS

Cohen, Highlights: Language- and Domain-Independent Automatic Indexing Terms for Abstracting, 1995 John Wiley & Sons, Inc., pp. 162-174, 1995.*

Author Unknown; "ViewState and Persistence of the CrystalReportViewer Object Model"; 2009; pp. 1-2; http://msdn.microsoft.com/en-us/library/ms225471.aspx.

U.S. Appl. No. 12/121,497, Aug. 31, 2011, Office Action.

U.S. Appl. No. 12/121,497, Apr. 27, 2012, Office Action.

Burns et al., "A Dynamic Reconfiguration Run-Time System", http://dcs.gla.ac.uk/research/fpga/papers/pdf/fccm97.pdf, 10 pages.

Barbacci et al., "Application-level Programming", http://ieeexplore.ieee.org/iel2/290/2912/00089315.pdf?tp=&isnumber=&arnumber=89315&htry=1, 8 pages.

Cervantes et al., "An Architecture Description Language for Dynamic Sensor-Based Applications", http://ieeexplore.ieee.org/iel5/4446298/04446338.pdf?tp=&isnumber=&arnumber=4446338, 5 pages.

Goldsack et al., "SmartFrog: Configuration and Automatic Ignition of Distributed Applications", http://www.hpl.hp.com/research/smartfrog/papers/SmartFrog_Overview_HPOVA03.May.pdf, 9 pages.

* cited by examiner

HIERARCHICAL VIEW STATE STORAGE

BACKGROUND

Background and Relevant Art

Computers and computing systems have affected nearly every aspect of modern living. Computers are generally involved in work, recreation, healthcare, transportation, entertainment, household management, etc.

Computer programming can take any one of a number of different forms. For example, computer programs are often written using imperative code that specifically commands certain functions to be performed. Some examples of higher level imperative code include Visual Basic® (VB), C#, etc. Some lower level imperative languages, such as assembly languages, may directly command computer hardware to perform certain functions.

In contrast to imperative programming, some relatively new programming techniques use declarative programming, that instead of commanding computer hardware to perform certain functions, certain results are specified. Underlying the declarative statements is imperative code that directs computer hardware to perform the commands to accomplish the desired results, but declarative programmers do not generally develop the imperative code. Rather, a developer can code imperative code for declarative elements, which a declarative code programmer can then use to create a declarative program.

In some declarative programming frameworks the specification of loosely coupled composite applications are allowed. This allows users the ability to customize the appearance and behavior of subcomponents of the application in a very fine-grained manner. For example, users might want to radically alter the appearance a particular cell in a table. It may be desirable to allow users to save these changes for later use. Thus, a persistence scheme for customizations may be useful.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method practiced in a computing environment, including acts for indexing domains of a declarative application with view state information for the domain to enable persisting the view state of the declarative application. The domains are organized in a tree. Each domain is built by a configuration builder. The method includes indexing a domain of a declarative application by indexing a path name in an index. The path name includes a path name of the parent domain of the domain; an identifier of the configuration builder used to build the domain, and an identifier of one or more local decisions made by the configuration builder when creating the domain. The method further includes correlating a unique identifier key to the path name in the index and correlating view state information for the domain to the unique key identifier.

Another embodiment is directed to a method practiced in a computing environment, including acts for determining view state of domains of a declarative application to enable rehydrating of the view state of the declarative application. The domains are organized in a tree. Each domain is built by a configuration builder. The method includes in preparation for building a domain, determining a path of a domain about to be built. The path includes: a path name of the parent domain of the domain; an identifier of the configuration builder used to build the domain; and an identifier of one or more local decisions that would be made by the configuration builder when creating the domain. The method further includes using the path, discovering a unique identifier key correlated to the path name, using the unique identifier, discovering if view state information for the domain exists, the view state information being correlated to the unique key identifier, and building the domain including applying any view state information to the domain.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein are directed to deriving a path for one or more domains of a declarative application and uniquely identifying view state and/or code that was run to produce the domain. The path can be indexed and used to retrieve view state for the domain. In some embodiments, view state information can include information defining an absolute state. For example, view state information for a domain that creates a scroll bar may include information indicating that the scroll bar is 50% scrolled. Alternatively or additionally, some embodiments may represent view state as a set of changes to the code used to produce the domain.

Embodiments may be applied to any one of a number of declarative programming frameworks. However, many of the embodiments described herein are illustrated by example using an XML application framework (XAF) such as is described in U.S. patent application Ser. No. 11/360,448 filed on Feb. 23, 2006, which is incorporated herein by reference in its entirety.

Figure 1:
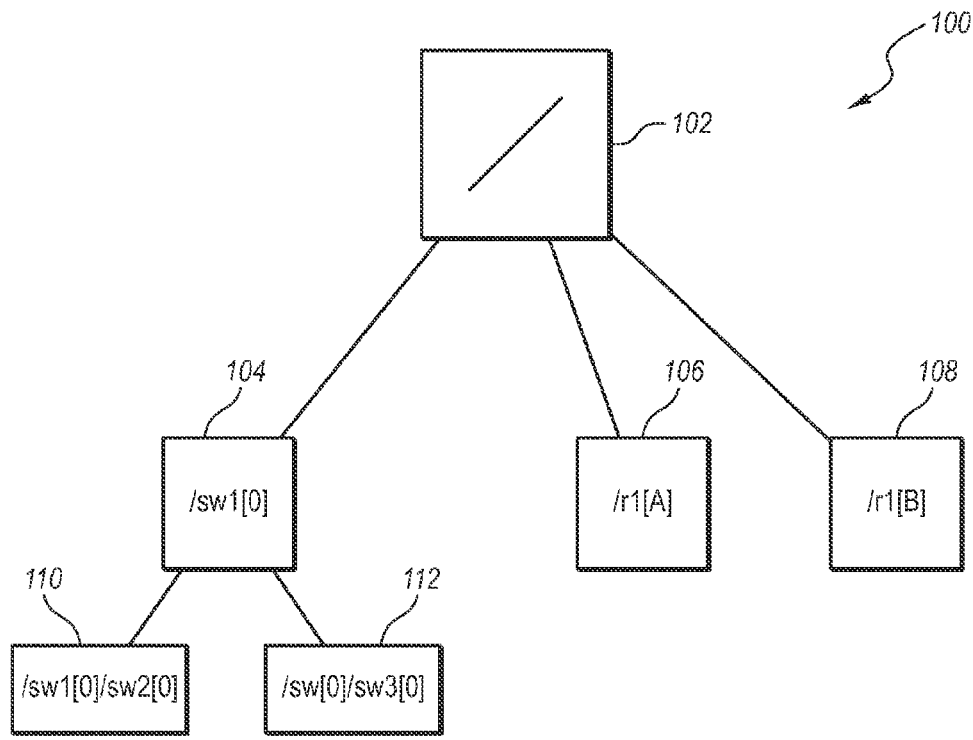
FIG. 1 illustrates a domain hierarchy for a simple declarative application.

An XAF application is defined as a tree of domains. A domain is a declarative group of objects that may sometimes be referred to herein as a composition of objects or simply as a composition. An example tree is illustrated in FIG. 1. FIG. 1 illustrates a domain hierarchy 100, including a root domain 102, a switch domain 104, two sub-domains 110 and 112 of the switch domain 104, a first repeater created domain 106, and a second repeater created domain 108, for a simple application built from the following source

```
<x:Body>
    <x:Switch Data="$data1">
        <x:Case Value="0">
            <x:Switch Data="$data3">
                <x:Case Value="A">...</x:Case>
                ...
            </x:Switch>
            <x:Switch Data="$data4">
                <x:Case Value="Z">...</x:Case>
                ...
            </x:Switch>
        </x:Case>
        <x:Case Value="1">...</x:Case>
        ...
    </x:Switch>
    <x:Repeater Data="$data2">...</x:Repeater>
</x:Body>
/x:Body>
``` when data1 is 0, data2 is a list containing A & B, data3 is A and data4 is Z. sw1 is used as the name of the outer switch configuration builder, r1 as the name of the repeater configuration builder, sw2 is used as the name of the first inner switch configuration builder, and sw3 used as the name of the second inner switch configuration builder. Data2 specifies that A and B are usable as primary keys.

In the present example, and as noted above, a domain is built by a configuration builder running declarative language code. Such declarative language code, in the XAF example, may be XAF Application Definition (XAD) or Dynamic XAD code. The declarative language code is described in more detail in U.S. patent application Ser. No. 11/360,856 filed on Feb. 23, 2006, which is incorporated herein by reference in its entirety.

Figure 2:
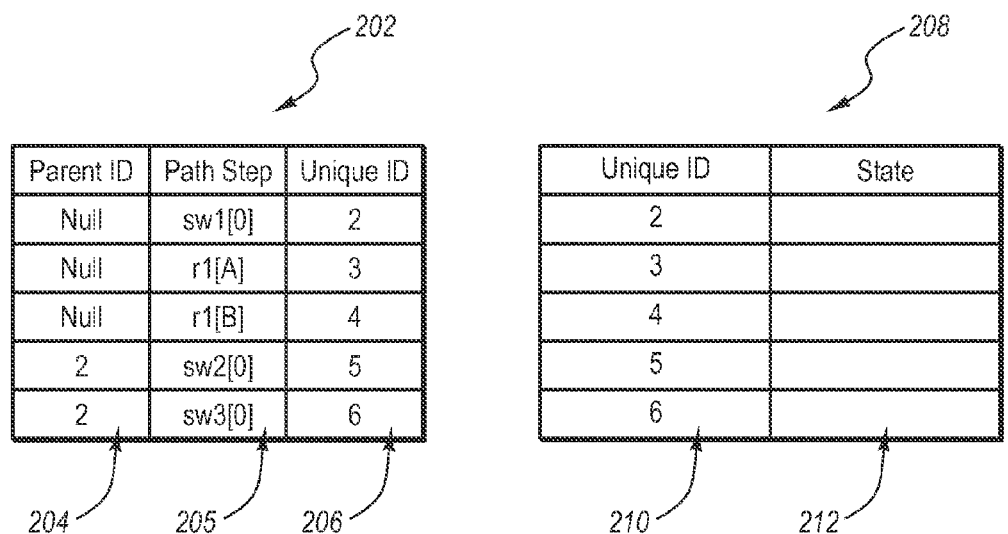
FIG. 2 illustrates simple database table correlating domains with state information.

As noted, embodiments may include indexing domains with state information. For example, in one embodiment, a name for a domain can be indexed to a unique ID. The unique ID can be used as a foreign key into another database table that indexes the unique ID to state information. Referring now to FIG. 2, database tables are illustrated. A first database table 202 includes a Unique ID column 206 which includes a unique ID for each domain, a Parent ID column 204 that includes the unique ID for a parent domain for a given domain, and a Path Step column 205 that includes the path step from the parent domain to the domain. FIG. 2 further illustrates a second table 208 including a unique ID column 210 and a state column 212 and which correlates unique IDs to state information. The unique ID entries in column 206 can be used as a foreign key into the second table 208.

Each object in the domain can be named by reference to the source responsible for the object's creation. One naming scheme is to use the identity of the corresponding source object. Disambiguation can be used if a single source object is responsible for the creation of multiple domain objects. Another option is to use an object's position in the creation order of the domain. If a fixed piece of source is used to drive the creation of a set of domain objects, they will be created in the same order each time. Each domain can contain both objects and configuration builders capable of building child sub-domains. A configuration builder can be identified by identifying the domain in which it lives, and its name within that domain. A domain can be identified by specifying its parent domain, the configuration builder in that domain responsible for its creation, and any local decisions made by that configuration builder. Thus, any domain can be identified using a path name so created.

The root domain (e.g., domain 102 illustrated in FIG. 1) is specified by the empty path. Child domains are specified by a path including the path of their parent domain, the name of the configuration builder within that domain, and any local decisions made by this configuration builder.

Local decisions of a configuration builder can vary for each sort of configuration builder. A number of representative examples are considered here. In particular, an invoker configuration builder, a switch configuration builder, and a repeater configuration builder are illustrated.

An invoker configuration builder is a configuration builder that simply invokes a dynamically determined function. For an invoker configuration builder, naming a decision can be accomplished, in one embodiment, by recording which function the invoker chooses to invoke.

A switch configuration builder includes functionality for selecting a sub-case from among a plurality of sub-cases. For a switch configuration builder, naming may include, in one embodiment, recording which sub-case is selected.

A repeater configuration builder applies one or more operations to data elements in a data collection, by applying the same operations to each data element in the data collection in each their own turn thus creating one or more sub-domains for each data element. For a repeater, naming may include, in one embodiment, identifying the element of the data collection that corresponds to the current sub-domain. This identification can be made either positionally, or intensionally. A positional identification records the position of the data element within the (ordered) data collection. An intensional identification records the identity of the data element. This identity might be the primary key of the data, or some computed key for the data. The exact method of computing the identity is a parameter of the repeater configuration builder. To allow the use of collections containing multiple elements with the same identity, one can additionally record the relative position of any repeated data elements.

With each domain with view state, the path of the domain is persistently associated with a storage location. This storage location is used to store the view state. However, this association need not be done for every domain, rather embodiments may perform the association only for those domains that actually have view state. FIG. 2 illustrates one example of how the path can be associated with a storage location and view state.

View state can be represented in a database in a number of different ways. For example, in one embodiment, the view state may be recorded in an absolute fashion. For example, in the example illustrated above, the scroll bar may be scrolled to a certain percentage. An indicator of the percentage can be recorded as absolute view state. In an alternative embodiment, view state may be represented in terms of a change. For example, declarative code may define how a user interface is displayed. At a time when view state is to be persisted, the appearance of the user interface may have changed from the displayed rendering created by executing the declarative code. Different declarative code may be able to create the view state as displayed at the time when it is desirable to persist the view state. In this embodiment, view state may be recorded as a change in declarative code.

Some embodiments may only support view state for domains produced using languages supporting dynamically reconfiguring at least a portion of an operating software application. Such a language is the dynamic XAD language described in U.S. patent application Ser. No. 12/121,497 filed on May 15, 2008, titled Dynamic Declarative Application Description, which is incorporated herein by reference in its entirety. The source code corresponding to one of these domains includes of a set of elements designating objects to be created, and relationships between these objects specifying how these objects are to be wired together. View state for these domains is modeled for a given domain as a set of changes to this underlying code. Possible changes include adding additional elements, subtracting existing elements, and changing the relationships between these elements so that the resulting objects will be wired together differently.

Configuration builders responsible for creating domains from dynamic XAD source are aware of the possibility that there may be view state. They know the path of the domain they are about to create. They also know the base source code for the domain to be created. They use the path to lookup the corresponding view state, such as by referencing the tables illustrated in FIG. 2. If none is present, they use the base source code to create the domain. If there is view state, they apply the specified changes to the source code, and use the resulting customized code to create the domain.

Configuration builders are active objects. When their inputs change, they are responsible for updating their outputs. The key input to configuration builders responsible for creating domains from dynamic XAD is the dynamic XAD itself. When the model changes, the resulting graph of objects is updated to reflect the changes in the dynamic XAD source. View state makes the inputs somewhat more complicated, but doesn't change the basic obligation. Instead of only having to consider the basic source code, responding to changes in the view state is also performed. New changes may be added. Existing changes may be deleted.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 3:
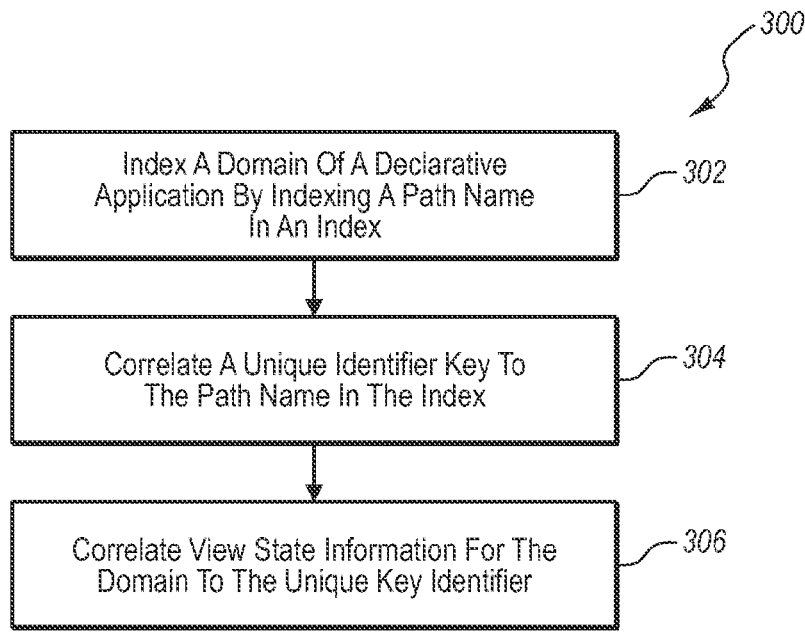
FIG. 3 illustrates a method of indexing domains.

Referring now to FIG. 3, a method 300 is illustrated. The method 300 may be practiced in a computing environment. The method includes acts for indexing domains of a declarative application with view state information for the domain to enable persisting the view state of the declarative application. The domains are organized in a tree. Further, each domain is built by a configuration builder. The method includes indexing a domain of a declarative application by indexing a path name in an index (act 302). The path name includes: a path name of the parent domain of the domain; an identifier of the configuration builder used to build the domain; and an identifier of one or more local decisions made by the configuration builder when creating the domain.

The method 300 further includes correlating a unique identifier key to the path name in the index (act 304). As illustrated in FIG. 2, an index may include a parent ID column 204, a path step column 205, and a unique ID column 206. A table like this can be used to store path names and to correlate them to a unique identifier key. Each step of the path uses a row of the table, in which is stored the unique ID associated with the parent steps of the path, the current path step, and the corresponding unique identifier key respectively.

The method 300 further includes correlating view state information for the domain to the unique key identifier (act 306). An example of this is illustrated in FIG. 2 which illustrates a second table 208 which includes a Unique ID column 210 and a state column 212. The unique key identifier may be stored in the Unique ID column 210 and correlated to view state information in the state column 212.

In one embodiment of the method 300, correlating a unique identifier key to the path name in the index (act 304) and correlating view state information for domain to the unique key identifier (act 306) may include correlating the path name of the domain and the unique identifier in a first table and using the unique identifier as a foreign key into a second table, the second table correlating view state information to the unique key identifier.

The acts of the method 300 may be repeated for each domain in the declarative application that has view state.

In one embodiment of the method 300, the domain is a root domain, and the path name of the parent domain of the domain is null.

In one embodiment of the method 300, underlying source code corresponds to the domain. The underlying source code includes a set of elements designating objects to be created and the relationships between these objects specifying how the objects are wired together. The view state information may include an enumeration of changes to the underlying source code from a base version of the underlying source code. In some of these embodiments, the changes are changes to source level elements. For example, the changes may include adding additional elements to the base version of the underlying source code, and/or subtracting elements from the base version of the underlying source code. Embodiments may be implemented such that the changes include changing relationships between elements in the base version of the underlying source code.

Some embodiments of the method 300 may be implemented where the changes include the addition, subtraction or replacement of an expression that builds objects and/or one or more compositions of objects.

Notably, embodiment where changes are made to underlying source code may be implemented where a master copy of the underlying source code remains unchanged and changes to the underlying source code are made by changing a local copy of the underlying source code. The underlying copy may be particular to the domain.

Figure 4:
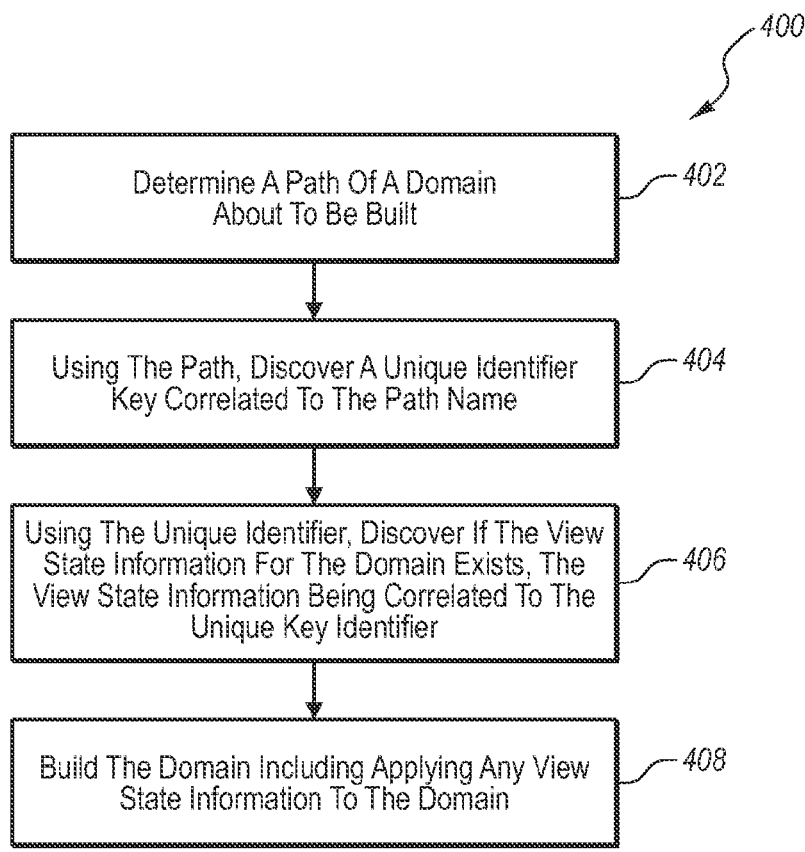
FIG. 4 illustrates a method of determining view state.

Referring now to FIG. 4, a method 400 is illustrated. The method 400 may be practiced in a computing environment. The method 400 includes acts for determining view state of domains of a declarative application to enable rehydrating of the view state of the declarative application. The domains are organized in a tree. Each domain is built by a configuration builder. The method 400 includes, in preparation for building a domain, determining a path of a domain about to be built (act 402). The path includes: a path name of the parent domain of the domain; an identifier of the configuration builder used to build the domain; and an identifier of one or more local decisions that would be made by the configuration builder when creating the domain.

The method 400 further includes using the path, discovering a unique identifier key correlated to the path name (act 404). The method includes using the unique identifier, discovering if view state information for the domain exists, the view state information being correlated to the unique key identifier (act 406). The method further includes building the domain including applying any view state information to the domain (act 408).

The method 400 may be practiced where the unique identifier key is correlated to the path name in a first table and the unique identifier is used as a foreign key into a second table the second table correlating view state information to the unique key identifier.

The method 400 may further include repeating the acts of the method 400 for each domain in the declarative application that has view state.

The method 400 may further include, if no view state exists for the domain, then building the domain to a default view state.

The method 400 may be practiced where the domain is a root domain, and the path name of the parent domain of the domain is null.

In one embodiment of the method 400, underlying source code corresponds to the domain. The underlying source code includes a set of elements designating objects to be created and the relationships between these objects specifying how the objects are wired together. The view state information may include an enumeration of changes to the underlying source code from a base version of the underlying source code. In some of these embodiments, the changes are changes to source level elements. For example, the changes may include adding additional elements to the base version of the underlying source code, and/or subtracting elements from the base version of the underlying source code. Embodiments may be implemented such that the changes include changing relationships between elements in the base version of the underlying source code.

Some embodiments of the method 400 may be implemented where the changes are enumerated by including an expression that builds objects and/or one or more compositions of objects.

Notably, embodiment where changes are made to underlying source code may be implemented where a master copy of the underlying source code remains unchanged and changes to the underlying source code are made by changing a local copy of the underlying source code. The underlying copy may be particular to the domain.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of indexing domains of a declarative application with view state information for the domain to enable persisting the view state of the declarative application, wherein the domains are organized in a tree, each domain being built by a configuration builder, the method comprising:

indexing a domain of a declarative application by indexing a path name in an index, wherein the path name comprises:
a path name of a parent domain of the domain;
an identifier of a configuration builder corresponding to the domain used to build the domain; and
an identifier of one or more local decisions made by the corresponding configuration builder when creating the domain;

correlating a unique identifier key to the path name in the index, wherein the unique identifier key is correlated to the path name in a first table of the index and the unique identifier key is used as a foreign key into a second table of the index; and correlating view state information for the domain to the unique identifier key in the second table in the index, wherein the view state information comprises an enumeration of changes to underlying source code for the corresponding configuration builder to build the domain from a base version of the underlying source code, while preserving the underlying source code for building the domain.

2. The method of claim 1, further comprising repeating the acts of claim 1 for each domain in the declarative application that has view state.

3. The method of claim 1, wherein the domain is a root domain, and the path name of the parent domain of the domain is null.

4. The method of claim 1, wherein the underlying source code comprises a set of elements designating objects to be created, and relationships between these objects specify how the objects are wired together.

5. The method of claim 4, wherein the changes are changes to source level elements.

6. The method of claim 5, wherein the changes comprise adding additional elements to the base version of the underlying source code.

7. The method of claim 5, wherein the changes comprise subtracting elements from the base version of the underlying source code.

8. The method of claim 5, wherein the changes comprise changing relationships between elements in the base version of the underlying source code.

9. The method of claim 4, wherein the changes include adding, subtracting or replacing an expression that builds objects and/or one or more compositions of objects.

10. The method of claim 4, wherein a master copy of the underlying source code remains unchanged and changes to the underlying source code are made by changing a local copy of the underlying source code, the underlying copy being particular to the domain.

11. In a computing environment, a method of determining view state of domains of a declarative application to enable rehydrating of the view state of the declarative application, wherein the domains are organized in a tree, each domain being built by a configuration builder, the method comprising:

in preparation for building a domain, determining a path of a domain about to be built, wherein the path comprises:
a path name of a parent domain of the domain;
an identifier of a configuration builder corresponding to the domain used to build the domain; and
an identifier of one or more local decisions that would be made by the corresponding configuration builder when creating the domain;

using the path name, discovering a unique identifier key that is correlated to the path name in an index, the unique identifier key being correlated to the path name in a first table in the index and the unique identifier being used as a foreign key into a second table in the index;

using the unique identifier key, discovering if view state information for the domain exists in the index, the view state information being correlated to the unique identifier key in the second table of the index, the view state information comprising an enumeration of changes to underlying source code for the corresponding configuration builder to build the domain from a base version of the underlying source code, while preserving the underlying source code for building the domain; and building the domain, including applying any view state information to the domain.

12. The method of claim 11, further comprising repeating the acts of claim 1 for each domain in the declarative application that has view state.

13. The method of claim 11, further comprising, if no view state exists for the domain, then building the domain to a default view state.

14. The method of claim 11, wherein the domain is a root domain, and the path name of the parent domain of the domain is null.

15. The method of claim 11, wherein the underlying source code comprises a set of elements designating objects to be created, and relationships between these objects specifies how the objects are wired together.

16. The method of claim 15, wherein the changes are changes to source level elements.

17. The method of claim 15, wherein the changes are enumerated by include adding, subtracting or replacing an expression that builds objects and/or one or more compositions of objects.

18. In a computing environment, a physical storage device comprising computer executable instructions that, when executed by a processor, cause the following to be performed:

in preparation for building a domain, determining a path of a domain about to be built, wherein the path comprises:
a path name of a parent domain of the domain;
an identifier of a configuration builder used to build the domain; and
an identifier of one or more local decisions that would be made by the configuration builder when creating the domain;

using the path, discovering a unique identifier key correlated to the path name, wherein the unique identifier key is correlated to the path name in a first table and the unique identifier key is used as a foreign key into a second table;

using the unique identifier, discovering if view state information for the domain exists, the view state information being correlated to the unique identifier key, wherein the second table correlates the view state information to the unique identifier key, wherein the view state information comprises an enumeration of changes to underlying source code for building the domain from a base version of the underlying source code, while preserving the underlying source code for building the domain; and building the domain including applying any view state information to the domain.

* * * * *